(12) United States Patent
Tchakerian

(10) Patent No.: US 10,332,154 B2
(45) Date of Patent: Jun. 25, 2019

(54) DEVICE, METHOD AND NON-TRANSITORY COMPUTER READABLE STORAGE MEDIUM FOR DETERMINING A MATCH BETWEEN PROFILES

(71) Applicant: Shant Tchakerian, Glendale, CA (US)

(72) Inventor: Shant Tchakerian, Glendale, CA (US)

( * ) Notice: Subject to any disclaimer, the term of this patent is extended or adjusted under 35 U.S.C. 154(b) by 709 days.

(21) Appl. No.: 14/520,302

(22) Filed: Oct. 21, 2014

(65) Prior Publication Data

US 2015/0112815 A1    Apr. 23, 2015

Related U.S. Application Data

(60) Provisional application No. 61/893,857, filed on Oct. 21, 2013.

(51) Int. Cl.
*G06Q 30/00* (2012.01)
*G06Q 30/02* (2012.01)

(52) U.S. Cl.
CPC .................. *G06Q 30/0269* (2013.01)

(58) Field of Classification Search
None
See application file for complete search history.

(56) References Cited

U.S. PATENT DOCUMENTS

| | | | |
|---|---|---|---|
| 2002/0111994 A1* | 8/2002 | Raghunandan | G06F 17/30867 709/203 |
| 2006/0161599 A1* | 7/2006 | Rosen | G06F 17/3087 |
| 2011/0276570 A1* | 11/2011 | Larsson | H04L 67/306 707/736 |
| 2012/0047565 A1* | 2/2012 | Petersen | G06Q 30/0204 726/7 |
| 2013/0166643 A1* | 6/2013 | Essas | G06Q 30/00 709/204 |
| 2013/0332848 A1* | 12/2013 | Lam | G06F 3/017 715/751 |
| 2014/0149384 A1* | 5/2014 | Krishna | G06F 17/30035 707/711 |
| 2014/0288999 A1* | 9/2014 | Ovadia Amsalem | G06Q 50/01 705/7.29 |
| 2014/0372372 A1* | 12/2014 | Schlomka | G06F 17/30029 707/609 |

* cited by examiner

*Primary Examiner* — Meredith A Long
(74) *Attorney, Agent, or Firm* — Shant Tchakerian

(57) ABSTRACT

Controlling an electronic device to acquire a personal profile for a person. The electronic device acquires a personal profile for a person identified by a unique identifier. The personal profile is a profile generated by applying big data analytics to personal data collected for the person identified by the unique identifier. Responsive to reception of at least one candidate profile, the electronic device is controlled to perform a match between the personal profile and the at least one candidate personal profile. The electronic device is controlled to provide at least one user-perceivable indicator that indicates a result of the match. The unique identifier of the person is a fingerprint received via a fingerprint scanner. The personal profile is generated and stored by a data processing system prior to receipt of the unique identifier.

10 Claims, 10 Drawing Sheets

DEVICE, METHOD AND NON-TRANSITORY COMPUTER READABLE STORAGE MEDIUM FOR DETERMINING A MATCH BETWEEN PROFILES

CROSS REFERENCE TO RELATED APPLICATIONS

This application claims the benefit of U.S. Provisional Patent Application No. 61/893,857, entitled "DEVICE, METHOD AND NON-TRANSITORY COMPUTER READABLE STORAGE MEDIUM FOR DETERMINING A MATCH BETWEEN TWO OR MORE PEOPLE," filed Oct. 21, 2013, the disclosure of which is incorporated by reference herein in its entirety.

FIELD

The present disclosure relates to determining a match between two or more profiles.

BACKGROUND

When meeting other people in person, it is often helpful to quickly discover other people who share a common interest. Knowledge of common interests helps spark conversation, and allows the people to work together more efficiently towards achieving a common objective.

When providing targeted advertising, it is often helpful to identify consumers who match a target profile.

SUMMARY

In an example embodiment, an electronic device comprises a computer-readable memory constructed to store computer-executable process steps and a processor constructed to execute the computer-executable process steps stored in the memory. The process steps stored in the memory include computer-executable process steps to acquire a personal profile for a person identified by a unique identifier received at the electronic device. The personal profile is a profile generated by applying big data analytics to personal data collected for the person identified by the unique identifier. Responsive to reception of at least one candidate personal profile of at least one candidate person, the process steps control the electronic device to perform a match between the personal profile and the at least one candidate personal profile. The process steps control the electronic device to provide at least one user-perceivable indicator that indicates a result of the match.

In an example embodiment, a method of controlling an electronic device to acquire a personal profile for a person is provided. The method includes controlling the electronic device to acquire a personal profile for a person identified by a unique identifier received at the electronic device. The personal profile is a profile generated by applying big data analytics to personal data collected for the person identified by the unique identifier. Responsive to reception of at least one candidate personal profile of at least one candidate person, the electronic device is controlled to perform a match between the personal profile and the at least one candidate personal profile. The electronic device is controlled to provide at least one user-perceivable indicator that indicates a result of the match.

In an example embodiment, a non-transitory computer-readable storage medium is provided. The non-transitory computer-readable storage medium stores computer-executable process steps that when executed by a processor of an electronic device, control the electronic device to acquire a personal profile for a person identified by a unique identifier received at the electronic device. The personal profile is a profile generated by applying big data analytics to personal data collected for the person identified by the unique identifier. Responsive to reception of at least one candidate personal profile of at least one candidate person, the process steps control the electronic device to perform a match between the personal profile and the at least one candidate personal profile. The process steps control the electronic device to provide at least one user-perceivable indicator that indicates a result of the match.

By virtue of the foregoing, people may more efficiently discover other people who share a common interest, and may discover a more meaningful connection with the other people.

In an example embodiment, a method of controlling an electronic device to acquire a personal profile for a person is provided. The method includes receiving a unique identifier of a person at the electronic device, and controlling the electronic device to acquire a personal profile for the person identified by the received unique identifier. The personal profile is a profile generated by applying big data analytics to personal data collected for the person identified by the unique identifier. The electronic device is controlled to store the acquired personal profile.

According to an aspect, the unique identifier of the person is received via a user-input device of the electronic device. According to an aspect, the unique identifier of the person is a fingerprint received via a fingerprint scanner.

According to an aspect, the personal profile is generated and stored prior to receipt of the unique identifier, and the personal profile is acquired by accessing the stored profile in response to receipt of the unique identifier.

According to an aspect, the personal data is collected prior to receipt of the unique identifier, and the personal profile is acquired by applying big data analytics to the collected personal data in response to receipt of the unique identifier.

According to an aspect, the personal data is generated prior to receipt of the unique identifier, and the personal profile is acquired by collecting the generated personal data and applying big data analytics to the collected personal data in response to receipt of the unique identifier.

According to an aspect, the personal data includes at least one of purchase data, user profile data, user preferences data, user recommendation data, customer review data, media consumption data, web browsing data, tax filing data, social network data, legal data, financial data, calendar data, e-mail data, Twitter data, geo-location data, travel history, photo data, medical data, criminal record data, marriage records, birth records, wedding registry data, DNA data, and employment data.

According to an aspect, the personal data is passively collected without requiring a user-input from the person, and the personal data is collected anonymously without processing any personally identifiable information. The personal profile is generated anonymously without processing any personally identifiable information. The personal profile is acquired by using a trusted third party to access the personal profile associated with the unique identifier. The personal data is collected by using a trusted third party to access the personal data associated with the unique identifier. According to one aspect, the personal data is collected from a plurality of data sources.

According to an aspect, the user-perceivable indicator is a display of information on a display device of the electronic device, the displayed information including a description of the match.

According to one aspect, the electronic device displays the personal profile in a human-readable format.

According to one aspect, the at least one candidate personal profile is received based on proximity of the electronic device to an electronic device of the at least one candidate person. According to one aspect, the at least one candidate personal profile is received based on physical contact between the electronic device and an electronic device of the at least one candidate person. According to one aspect, location information identifying a location of the electronic device is determined, and each received candidate personal profile is received from an electronic device having a location within an area determined by the determined location information. According to one aspect, the location information describes a place, and each received candidate personal profile is received from an electronic device located in the place described by the location information. According to one aspect, the location information describes an event, and each received candidate personal profile is received from an electronic device located at the event described by the location information. According to one aspect, the location information describes location coordinates, and each received candidate personal profile is received from an electronic device located within a specified distance from the location coordinates described by the location information.

According to one aspect, the electronic device is at least one of a computer, a tablet, a wearable electronic device, a smart band, a digital watch, a smart watch, a digital camera, a video camera, a mobile phone, a mobile computer, a digital music player, and a personal digital assistant (PDA).

According to one aspect, the match includes at least one of a social match, a romantic match, a business match, a job seeker and prospective employer match, a buyer and seller match, and a service provider and client match. According to one aspect, the match is performed by using big data analytics.

This brief summary has been provided so that the nature of this disclosure may be understood quickly. A more complete understanding can be obtained by reference to the following detailed description and to the attached drawings.

DETAILED DESCRIPTION

The inventor has observed that a person's interests can be identified by performing Big Data analytics. For example, a person's purchase data (e.g., from credit cards, customer loyalty cards, and the like), media consumption data (e.g., TV viewing data, Internet media streaming data, iTunes media data), web browsing data, tax filing data, social network data, calendar data, e-mail data, Twitter data, geo-location data, travel history, photo data, medical data, criminal record data, DNA data, employment data, and the like can be analyzed determine a person's interests and objectives. Based on this analytics, a profile can be generated for the person, and this profile can be compared with similarly generated profiles of other people to determine a match between two or more people.

In view of the foregoing, a device, method and non-transitory computer readable storage medium are provided for determining a match between two or more people, based on personal profiles generated by analyzing personal information.

When a person carrying an electronic device that functions according to the claims herein is near a person with a similar device (or, alternatively, when bumping devices with another person), the device indicates whether the two people share common interests, based on big data analytics. The match could be a social match, a romantic match, a business match, a job seeker and prospective employer match, a buyer and seller match, a service provider and client match, and the like. Fingerprint recognition is used to automatically configure the device with the person's personal profile, which is then used to determine a match with other people.

Figure 1:
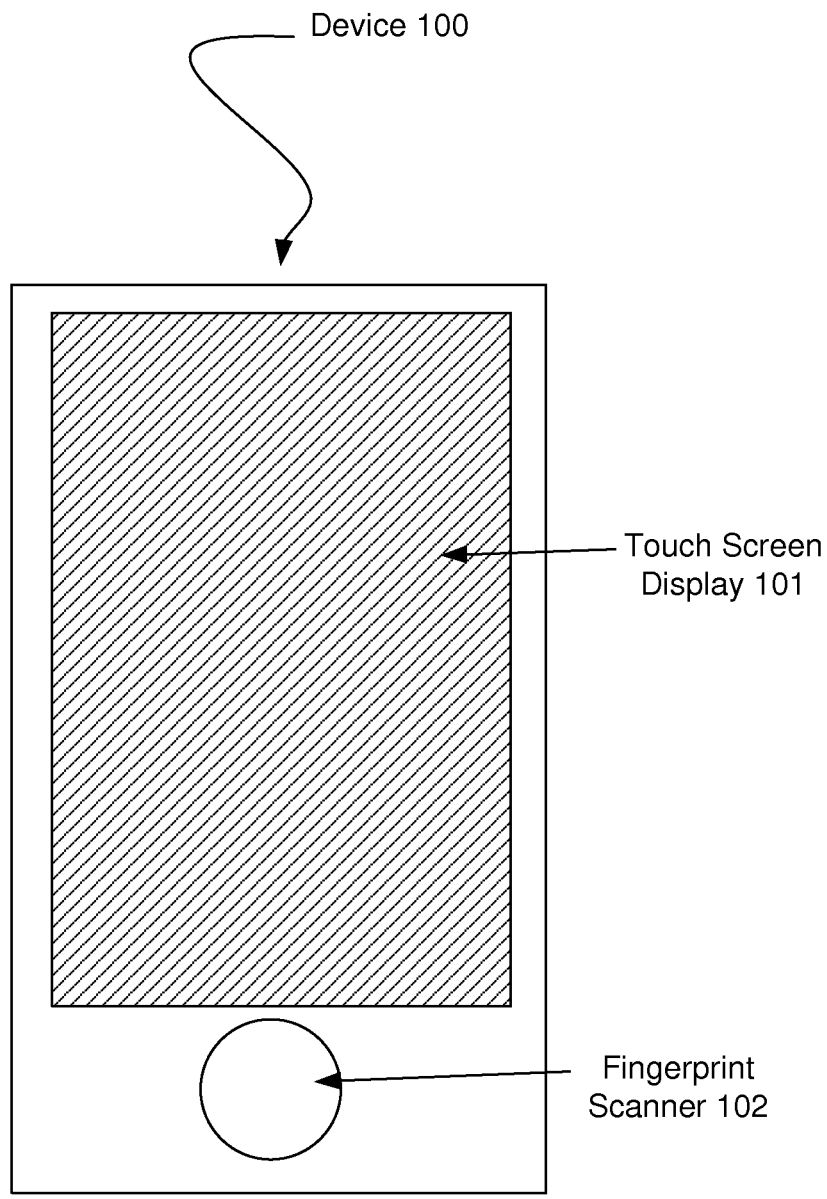
FIG. 1 is a view of an electronic device according to an example embodiment.

FIG. 1 is a view of an electronic device 100 according to an example embodiment. In the example embodiment, electronic device 100 is a smart phone. In some embodiments, the electronic device can be one or more of a computer, a tablet, a wearable electronic device, a smart band, a digital watch, a smart watch, a digital camera, a video camera, a mobile phone, a mobile computer, a digital music player, and a personal digital assistant (PDA)

In the example embodiment, the electronic device 100 is controlled to acquire a personal profile for a person identified by a unique identifier received at the electronic device 100. The personal profile is a profile generated by applying big data analytics to personal data collected for the person identified by the unique identifier. Responsive to reception of at least one candidate personal profile of at least one candidate person, the electronic device 100 is controlled to perform a match between the personal profile and the at least one candidate personal profile. The electronic device 100 is controlled to provide at least one user-perceivable indicator that indicates a result of the match.

In the example embodiment, the unique identifier of the person is a fingerprint received via a fingerprint scanner 102.

In some embodiments, the unique identifier of the person can be any type of identifier that can uniquely identify a person, and the unique identifier can be received via any type of user-input device of the electronic device. For example, the unique identifier can be any combination of one or more of a fingerprint, a social security number, a driver's license number, a phone number, a birth date, a passport number, a biometric identifier, a credit card number, an address, an employer identifier, an educational identifier, a marital status identifier, and a DNA identifier.

In the example embodiment, the personal profile is generated by applying big data analytics to personal data collected for the person identified by the unique identifier, and the generated profile is stored prior to receipt of the unique identifier. In the example embodiment, the personal profile is generated by a data processing system (not shown). In some embodiments, the personal profile can be generated by the electronic device 100. In the example embodiment, the electronic device 100 acquires the personal profile by accessing the stored profile in response to receipt of the unique identifier. In the example embodiment, the personal data is data that is automatically generated by a data processing system, such as, for example, the data processing system used to generate the personal profile, or a different data processing system. In the example embodiment, the personal data is collected prior to receipt of the unique identifier. In the example embodiment, the personal data is collected by a data processing system (not shown). In the example embodiment, the personal data is generated prior to receipt of the unique identifier. In the example embodiment, the personal data is generated by a data processing system (not shown).

In some embodiments, the personal data can be collected by the electronic device 100. In some embodiments, the electronic device can acquire the personal profile by applying big data analytics to the collected personal data in response to receipt of the unique identifier.

In some embodiments, the personal data can be generated by the electronic device 100. In some embodiments, the electronic device can acquire the personal profile by collecting the generated personal data and applying big data analytics to the collected personal data in response to receipt of the unique identifier.

In the example embodiment, the personal data includes, for example, at least one of purchase data, user profile data, user preferences data, user recommendation data, customer review data, media consumption data, web browsing data, tax filing data, social network data, legal data, financial data, calendar data, e-mail data, Twitter data, geo-location data, travel history, photo data, medical data, criminal record data, marriage records, birth records, wedding registry data, DNA data, employment data, and the like.

In the example embodiment, the personal data is passively collected without requiring a user-input from the person for whom the profile is acquired. In the example embodiment, this person is the person using the electronic device 100. The personal data is collected anonymously without processing any personally identifiable information, and the personal profile is generated anonymously without processing any personally identifiable information. The personal profile is acquired by using a trusted third party to access the personal profile associated with the unique identifier, and the personal data is collected by using a trusted third party to access the personal data associated with the unique identifier. The personal data is collected from a plurality of data sources.

In some embodiments, the personal data can be collected from a single source. In another embodiment, the personal data is not collected anonymously. In another embodiment, the personal profile is not generated anonymously.

In the example embodiment, the user-perceivable indicator is a display of information on display device, such as, for example, the touch screen display 101 of the electronic device 100. In the example embodiment, the displayed information includes a description of the match. In some embodiments, any user-perceivable indicator capable of indicating a result of the match can be provided. Other user-perceivable indicators include, for example, visual indicators, such as a LED or a display, and audible indicators.

In the example embodiment, the electronic device 100 displays the personal profile in a human-readable format on the display 101.

In the example embodiment, a candidate personal profile is received by the electronic device 100 based on physical contact between the electronic device 100 and an electronic device of a candidate person. For example, the user of electronic device 100 can bump the device 100 against the electronic device of a candidate person.

In another embodiment, a candidate personal profile is received based on proximity of the electronic device 100 to an electronic device of the candidate person.

In another embodiment, location information identifying a location of the electronic device 100 is determined, by using, for example, a GPS unit in electronic device 100. A candidate personal profile from an electronic device having a location within an area determined by the determined location information is received by the electronic device 100. In some embodiments, the location information describes a place, and each received candidate personal profile is received from an electronic device located in the place described by the location information. A place can be, for example, a restaurant, a stadium, an amusement park, an attraction, a museum, an airport, a building, a school, a subway, an airplane, a boat, a bus, a library, and the like. In some embodiments, the location information describes an event, and each received candidate personal profile is received from an electronic device located at the event described by the location information. A place can be, for example, a concert, a sporting event, a conference, a social event, a business event, and the like. In some embodiments, the location information describes location coordinates, and each received candidate personal profile is received from an electronic device located within a specified distance from the location coordinates described by the location information.

In the example embodiment, the match is performed by using at least one matching algorithm. In the example embodiment, the match is performed by the electronic device 100. In some embodiments, the match can be performed by another device or data processing system.

In the example embodiment, the matching algorithm includes at least one of a heuristic match, a keyword match, a value match, an image match, a statistical match, a social match, and an audio match. In the example embodiment, the match is performed by using multiple, different matching algorithms, each matching algorithm for matching a particular type of profile data included in the personal profile and the at least one candidate personal profile. In the example embodiment, the match is performed by using big data analytics.

In the example embodiment, the match includes at least one of a social match, a romantic match, a business match, a job seeker and prospective employer match, a buyer and seller match, and a service provider and client match.

Figure 2:
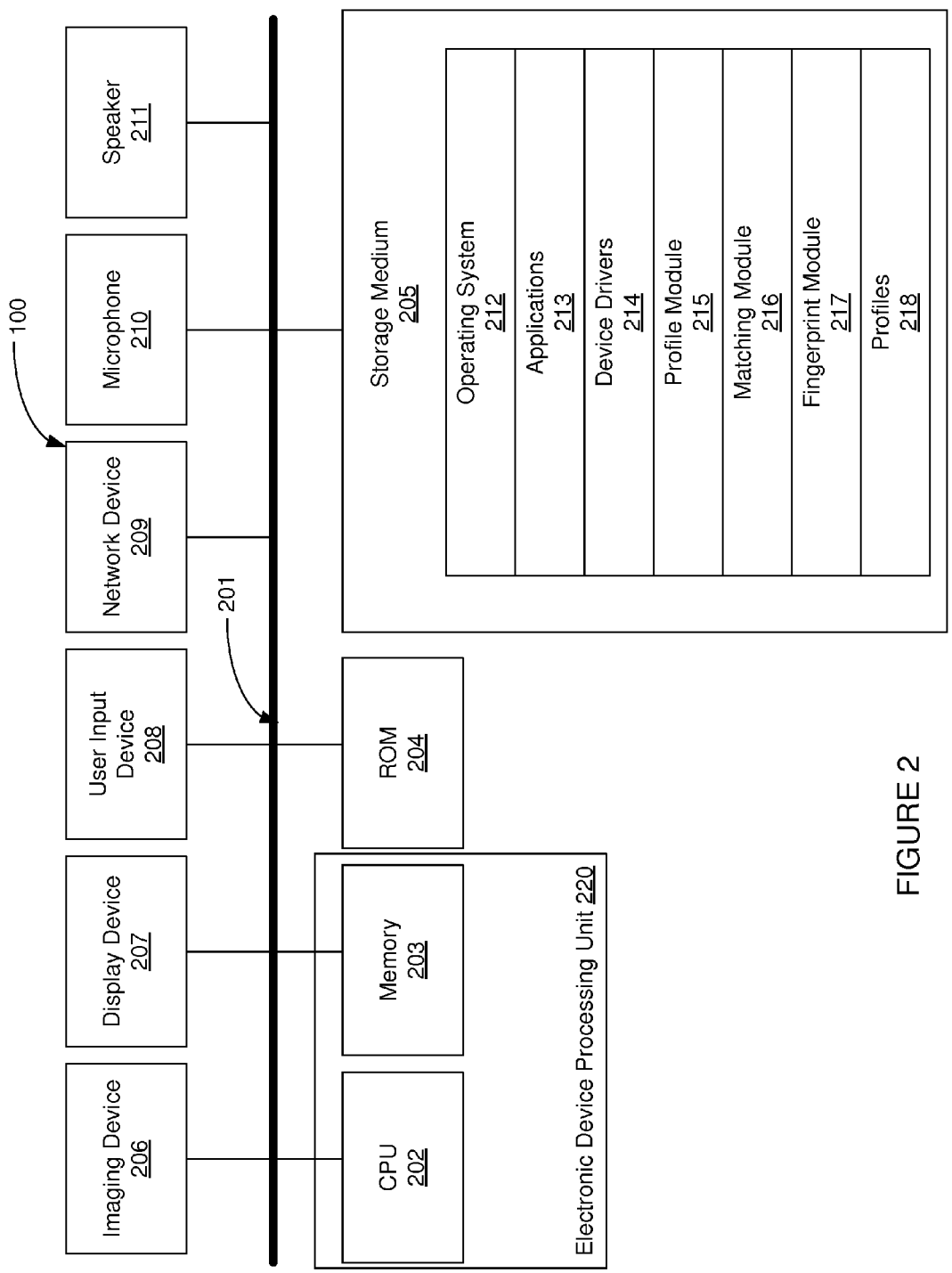
FIG. 2 is a diagram depicting the internal architecture of the electronic device of FIG. 1 according to an example embodiment.

FIG. 2 is a detailed block diagram depicting the internal architecture of the device 100 of FIG. 1 according to an example embodiment.

The bus 201 interfaces with a one or more processors 202, a random access memory (RAM) 203, a read only memory (ROM) 204, a computer-readable storage medium 205, an image capture device 206, a display device 207, a user input device 208, a network device 209, a microphone 210, a speaker 211, a GPS device (not shown), a proximity sensor (not shown), a motion sensor (not shown), an accelerometer (not shown), and a gyroscope (not shown).

The one or more processors 202 may take many forms, such as, but not limited to: a central processing unit (CPU); a multi-processor unit (MPU); an ARM processor; or the like.

In the example embodiment, the one or more processors 202 and the random access memory (RAM) 203 form a processing unit 220. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

User input device 208 receives scanned fingerprint data from fingerprint scanner 102, and receives user input from touch screen display 101. Display device 207 controls display of touch screen display 101.

The network device 209 provides one or more wired or wireless interfaces for exchanging data and commands between the device 100 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 212, application programs 213, and device drivers 214) are loaded into the memory 203 (of the processing unit 220) from the computer-readable storage medium 205, the ROM 204 or any other storage location. During execution of these software programs and modules, the respective machine-executable instructions are accessed by the CPU 202 (of the processing unit 220) via the bus 201, and then executed by the CPU 202. Data used by the software programs and modules are also stored in the memory 203, and such data is accessed by the CPU 202 during execution of the machine-executable instructions of the software programs and modules.

The computer-readable storage medium 205 is one of a (or a combination of two or more of) a hard drive, a flash drive, a DVD, a CD, a flash storage, a solid state drive, a ROM, an EEPROM, and the like. The computer-readable storage medium 205 includes an operating system 212, the software programs 213, device drivers 214, a profile module 215, a matching module 216, a fingerprint module 217, and profiles 218.

In the example embodiment, the processing unit 220 loads machine-executable instructions of the profile module 215 and executes the instructions to acquire a personal profile for a person identified by a unique identifier received at the electronic device 100. In the example embodiment, the unique identifier of the person is a fingerprint received via the fingerprint scanner 102 and the user input device 208. The fingerprint scanner 102 is controlled by machine-readable instructions of the fingerprint module 217.

The personal profile is a profile generated by applying big data analytics to personal data collected for the person identified by the unique identifier. In the example embodiment, the personal profile is generated by a data processing system (not shown). In the example embodiment, processing unit 220 acquires the personal profile by accessing the profile from stored profiles 218 in response to receipt of the unique identifier. Alternatively, the processing unit 220 acquires the personal profile by accessing a remotely stored profile via the network device 209, in response to receipt of the unique identifier.

Responsive to reception of at least one candidate profile (e.g., a personal profile of at least one candidate person or a target personal profile of a marketer) via the network device 209, the processing unit 220 loads machine-executable instructions of the matching module 216 and executes the instructions to perform a match between the personal profile and the at least one candidate profile. In the example embodiment, the match is performed by comparing keywords of the personal profile with one or more keywords of the candidate profile. The processing unit 220 controls the display device 207 to display at least one user-perceivable indicator that indicates a result of the match on touch screen display 101.

Figure 3:
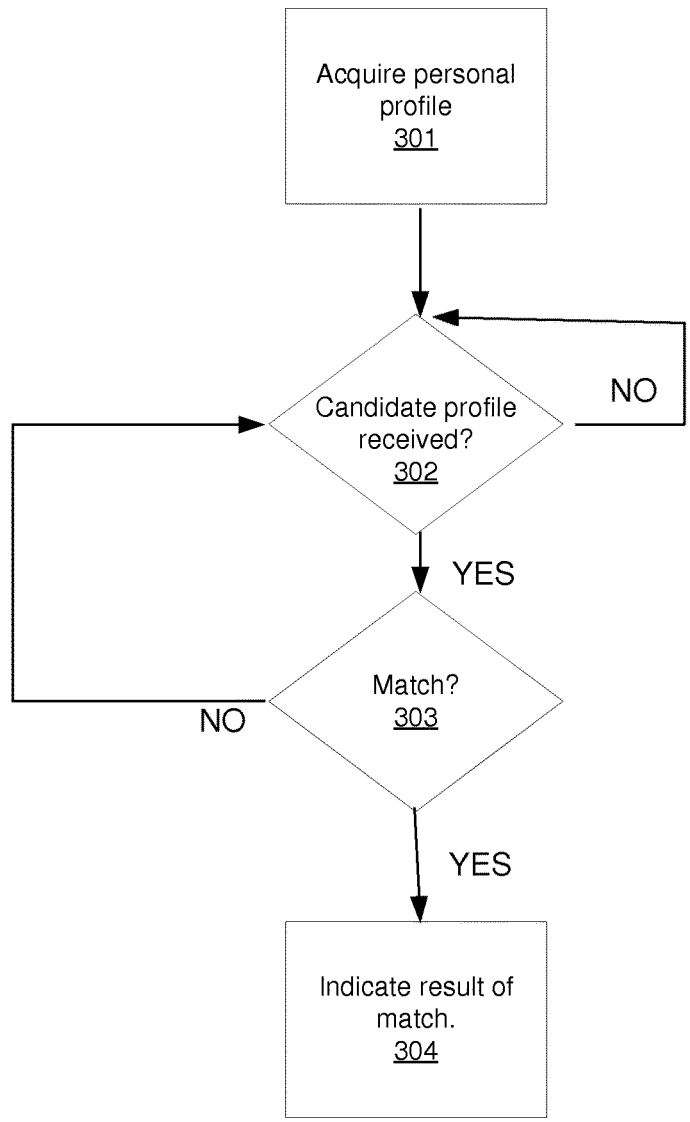
FIG. 3 is a flow diagram for explaining processing performed by the electronic device of FIG. 1 according to an example embodiment.

FIG. 3 is a flow diagram for explaining processing performed by the electronic device 100 of FIG. 1 according to an example embodiment.

The following is an example of a matching scenario performed by the electronic device 100. A user of device 100 posts an updated resume on a job searching web-site, and the resume indicates that the user of device 100 is a software developer. The data processing system (not shown) collects the resume of the user of device 100 and uses it, along with other personal data, to generate a personal profile for the user of device 100. The personal profile indicates, for example, that the user is a software engineer seeking employment at a software company.

Responsive to the user of device 100 scanning their finger on the fingerprint scanner 102 of device 100, at 301, the electronic device 100 is controlled to acquire the personal profile for the user, who is identified by the scanned fingerprint data received at the electronic device 100 via the fingerprint scanner 102.

At 302, a determination is made as to whether a candidate profile has been received. In the example embodiment, the user of electronic device 100 bumps the device 100 against the electronic device of a candidate person to exchange profiles. If a candidate profile has not been received ("NO" at 302) processing returns to 302. If a candidate profile has been received ("YES" at 302) processing proceeds to 303. At 303, the electronic device 100 is controlled to perform a match between the personal profile of the user and the at least one candidate personal profile. The candidate personal profile is a profile that has been generated the same way as with the user profile of device 100 by using big analytics.

For example, if a candidate has a social network profile indicating that they are in the hiring department at a software company, and the software company's web site has a job posting for a software engineer, the data processing system (not shown) collects the candidate's social network profile data and the software company's job listing, and uses this collected data, along with other personal data, to generate a personal profile for the candidate. The candidate profile indicates, for example, that the candidate is a hiring manager seeking to hire a software engineer for the software company. If the user of device 100 and the candidate meet at a software developer conference and bump devices, then their profiles will be matched. Since, in this example, the personal profile of the user of device 100 indicates that the user is a software engineer seeking employment at a software company and the candidate profile indicates that the candidate is a hiring manager seeking to hire a software engineer for the software company, the result of the match will indicate that a match has been found between the user of device 100 and the candidate.

If a match has been identified ("YES" at 303), then processing proceeds to 304 and the processing unit 220 executes instructions of the matching module 216 to control the display device 207 to display at least one user-perceivable indicator that indicates a result of the match on touch screen display 101.

If a match has not been identified ("NO" at 303), then processing returns to 302.

Figure 4:
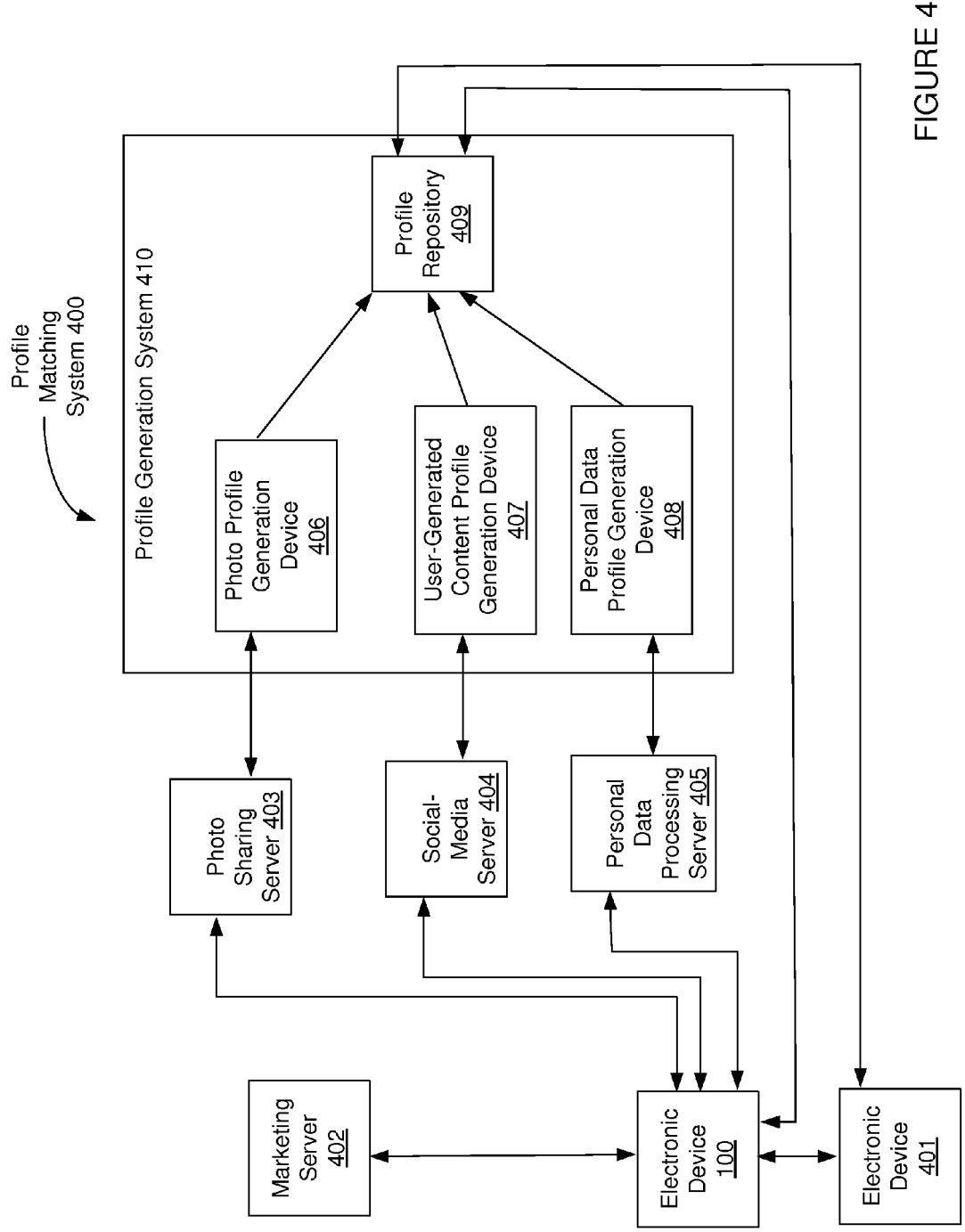
FIG. 4 is a diagram depicting a profile matching system according to an example embodiment.

FIG. 4 is a diagram depicting a profile matching system 400 that includes the electronic device 100 and an electronic device 401, a profile generation system 410, a marketing server 402, a photo sharing server 403, a social media server 404, and a personal data processing server 405. The profile generation system 410 includes a photo profile generation device 406, a user-generated content profile generation device 407, a personal data profile generation device 408, and a profile repository 409.

Figure 5:
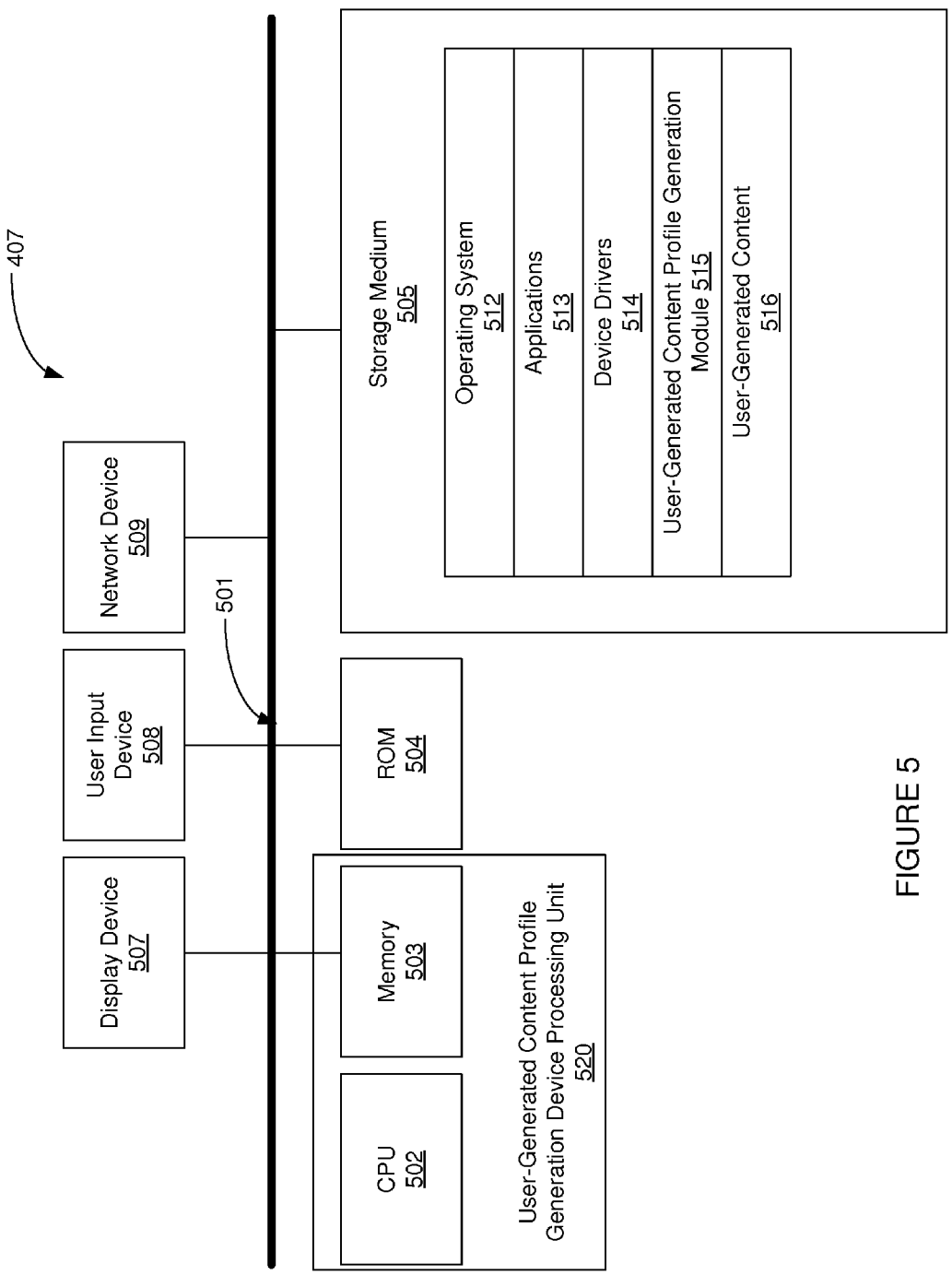
FIG. 5 is a block diagram depicting the internal architecture of a user-generated content profile generation device according to an example embodiment.
Figure 6:
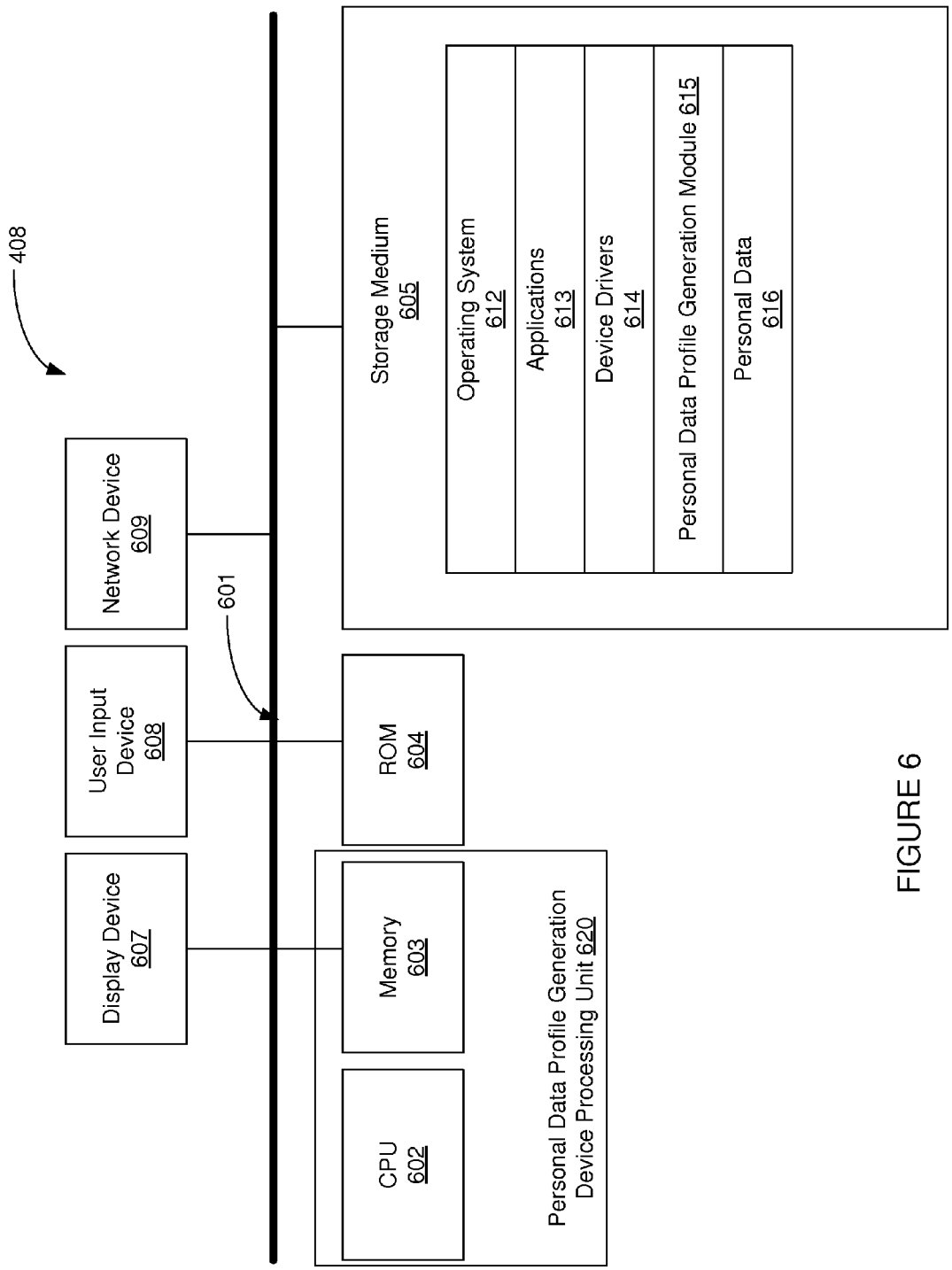
FIG. 6 is a block diagram depicting the internal architecture of a personal data profile generation device according to an example embodiment.
Figure 7:
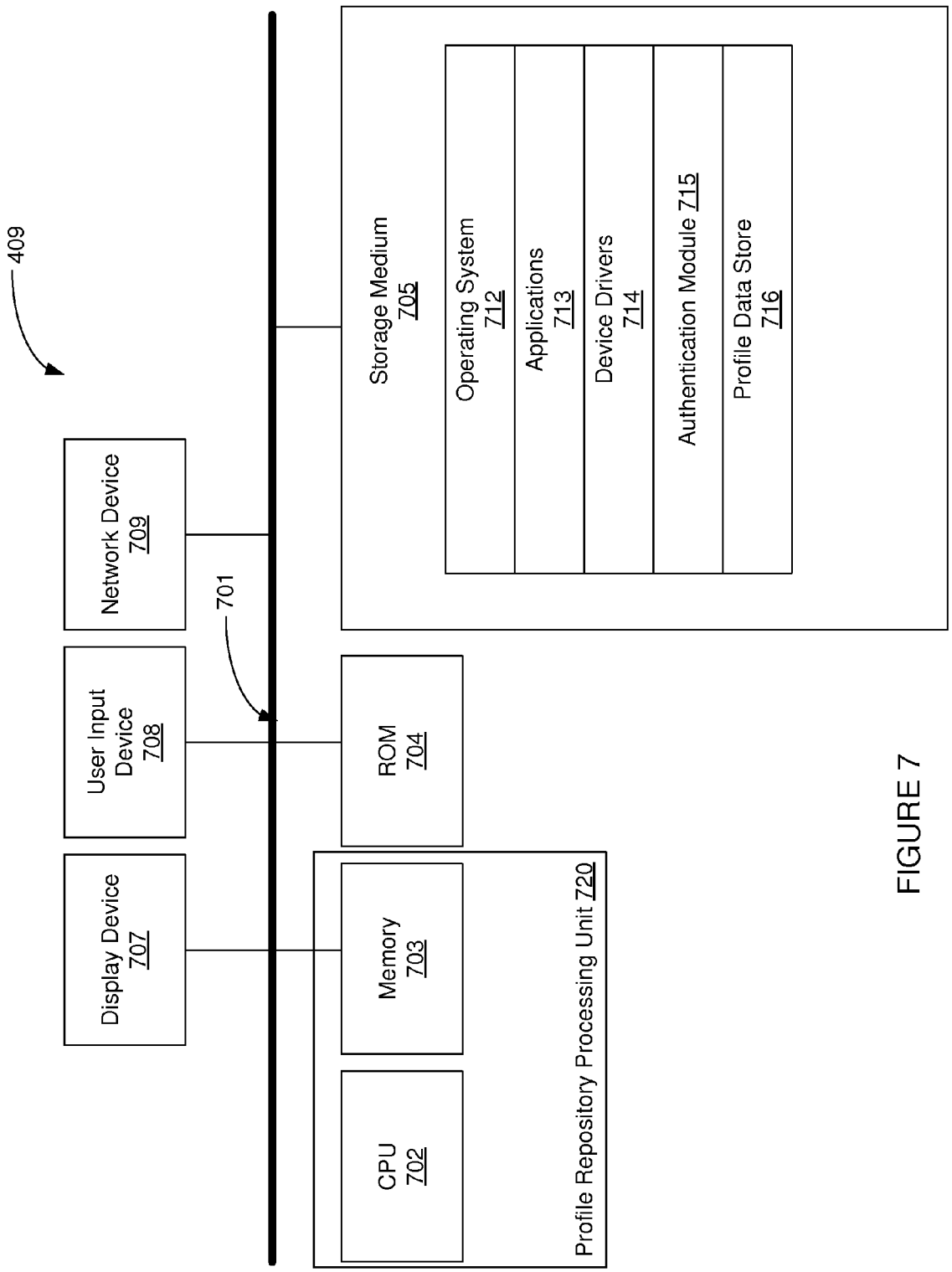
FIG. 7 is a block diagram depicting the internal architecture of a profile repository according to an example embodiment.
Figure 8:
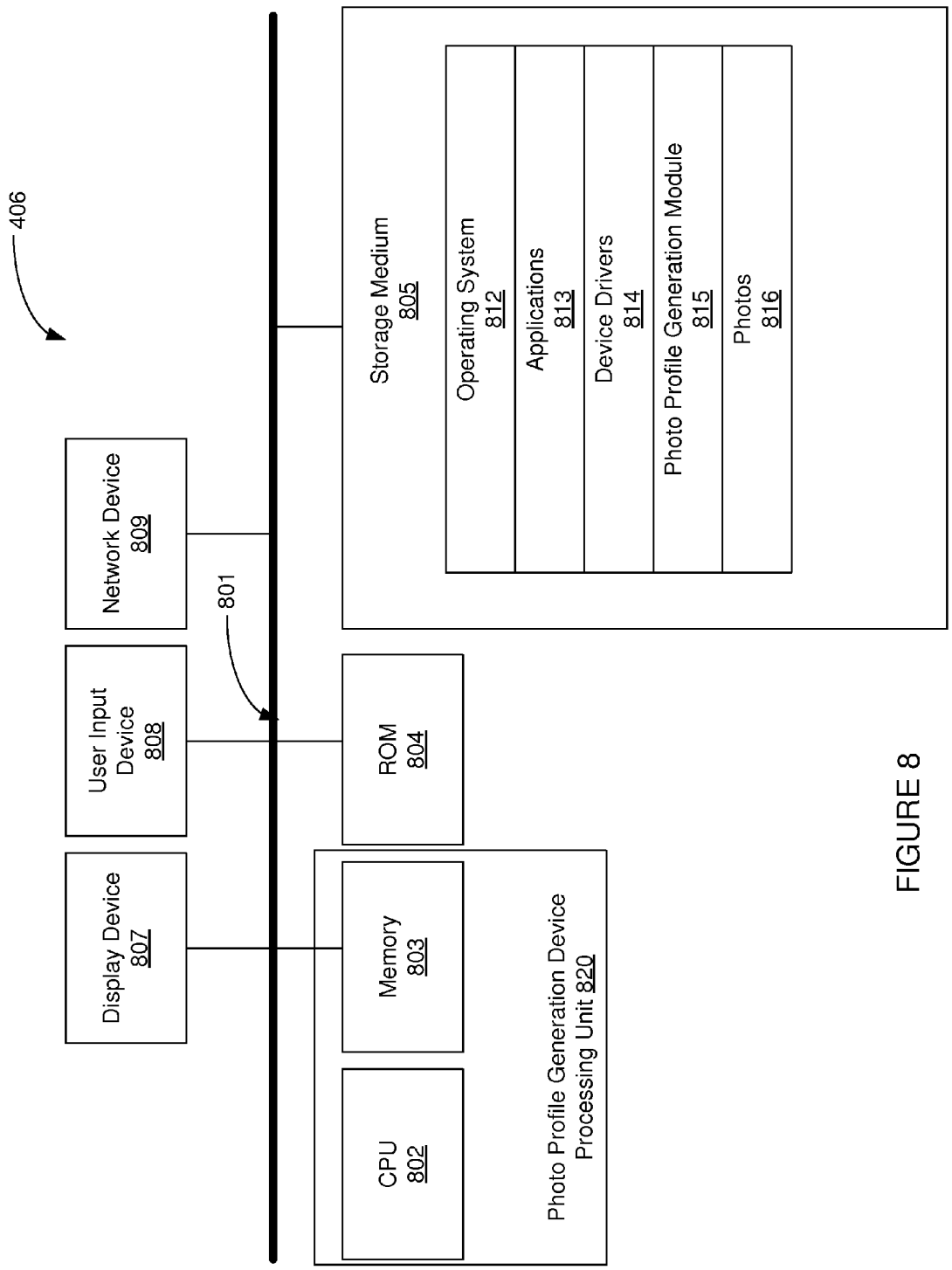
FIG. 8 is a block diagram depicting the internal architecture of a photo profile generation device according to an example embodiment.
Figure 9:
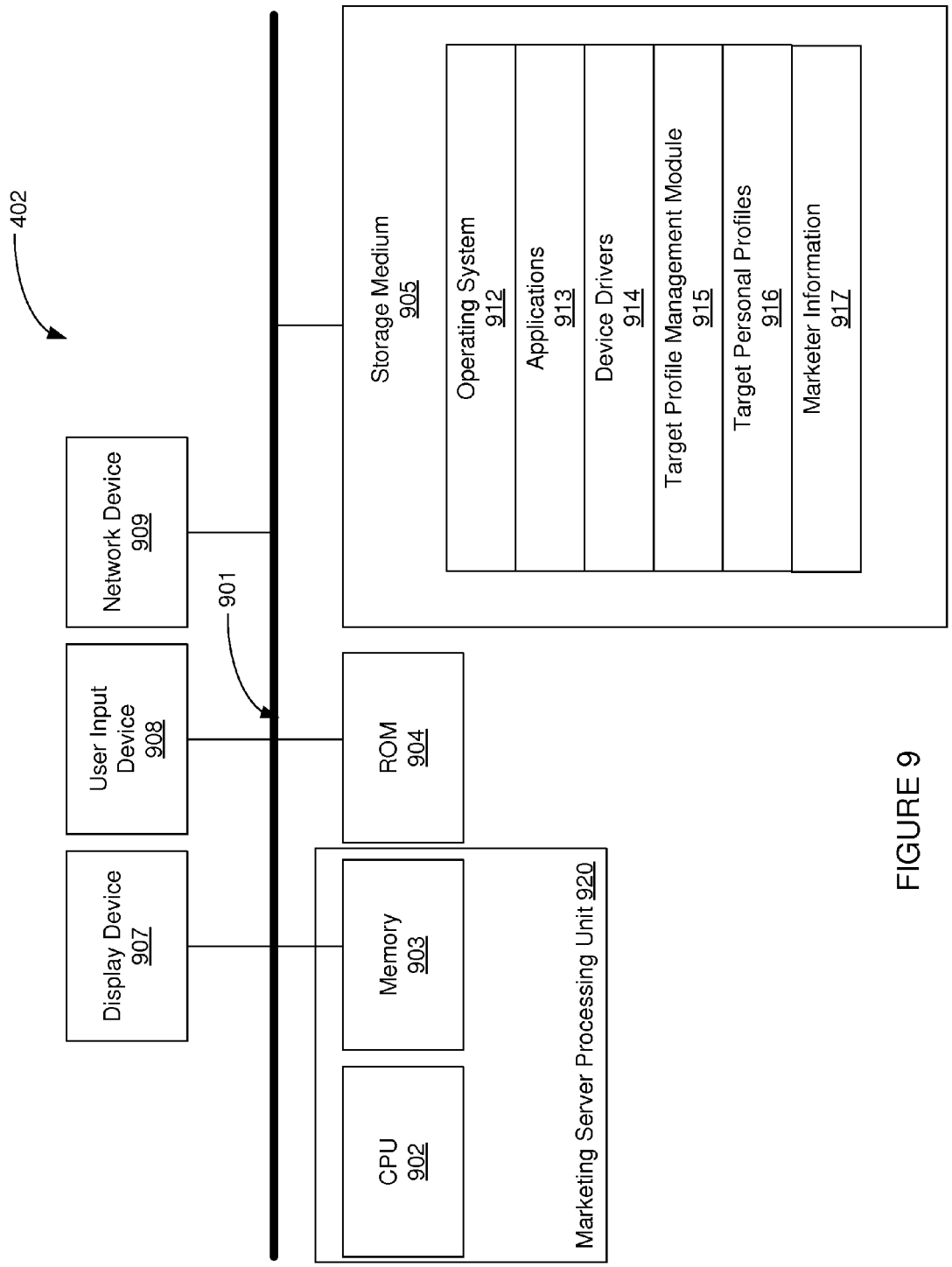
FIG. 9 is a block diagram depicting the internal architecture of a marketing server according to an example embodiment.

FIG. 5 is a detailed block diagram depicting the internal architecture of the user-generated content profile generation device 407. FIG. 6 is a detailed block diagram depicting the internal architecture of the personal data profile generation device 408. FIG. 7 is a detailed block diagram depicting the internal architecture of the profile repository 409. FIG. 8 is a detailed block diagram depicting the internal architecture of the photo profile generation device 406. FIG. 9 is a detailed block diagram depicting the internal architecture of the marketing server 402.

Reverting to FIG. 4, the electronic device 100 is constructed to communicatively couple with another electronic device 401, which is similar to the electronic device 100. More specifically, the electronic device 401 has an architecture that is similar to the architecture described above with respect to FIG. 2, and the electronic device is constructed to perform the process described above with respect to FIG. 3.

The electronic device 401 is constructed to communicatively couple with the electronic device 100 and the profile generation system 410.

The electronic device 100 is also constructed to communicatively with the marketing server 402, the profile generation system 410, the photo sharing server 403, the social media server 404, and the personal data processing server 405.

In some embodiments, during communication between the electronic device 100 and the profile generation system 410, the electronic device 100 is not communicatively coupled with one or more of the photo sharing server 403, the social media server 404, the personal data processing server 405, the marketing server 402, and the electronic device 401.

In some embodiments, during communication between the electronic device 100 and the marketing server 402, the electronic device 100 is not communicatively coupled with one or more of the photo sharing server 403, the social media server 404, the personal data processing server 405, the profile generation system 410, and the electronic device 401.

In some embodiments, during communication between the electronic device 100 and the electronic device 401, the electronic device 100 is not communicatively coupled with one or more of the photo sharing server 403, the social media server 404, the personal data processing server 405, the profile generation system 410, and the marketing server 402.

In some embodiments, during communication between the electronic device 100 and the photo sharing server 403, the electronic device 100 is not communicatively coupled with one or more of the electronic device 401, the social media server 404, the personal data processing server 405, the profile generation system 410, and the marketing server 402.

In some embodiments, during communication between the electronic device 100 and the social media server 404, the electronic device 100 is not communicatively coupled with one or more of the electronic device 401, the photo sharing server 403, the personal data processing server 405, the profile generation system 410, and the marketing server 402.

In some embodiments, during communication between the electronic device 100 and the personal data processing server 405, the electronic device 100 is not communicatively coupled with one or more of the electronic device 401, the photo sharing server 403, the social media server 404, the profile generation system 410, and the marketing server 402

Turning to the profile generation system 410, the photo profile generation device 406, the user-generated content profile generation device 407, and the personal data profile generation device 408 are constructed to communicatively couple with the photo sharing server 403, the social media server 404, and the personal data processing server 405, respectively, by using a corresponding application programming interface (API).

The photo profile generation device 406, the user-generated content profile generation device 407, and the personal data profile generation device 408 are each communicatively coupled with the profile repository 409.

In some embodiments, the profile generation system 410 includes one or more of the photo profile generation device 406, the user-generated content profile generation device 407, and the personal data profile generation device 408. In some embodiments, the electronic devices 100 and 401 each include a profile matching system similar to the profile matching system 400.

In some embodiments, the marketing server 402 includes a profile matching system similar to the profile matching system 400.

The personal data processing server 405 is constructed to automatically generate personal data. In the example embodiment, personal data includes, for example, one or more of purchase data, user profile data, user preferences data, user recommendation data, customer review data, media consumption data, web browsing data, tax filing data, social network data, legal data, financial data, calendar data, e-mail data, Twitter data, geo-location data, travel history, photo data, medical data, criminal record data, marriage records, birth records, wedding registry data, DNA data, employment data, and the like.

Turning to the architectures of the user-generated content profile generation device 407, the personal data profile generation device 408, the profile repository 409, the photo profile generation device 406, and the marketing server 402, FIG. 5 is a detailed block diagram depicting the internal architecture of the user-generated content profile generation device 407.

The bus 501 interfaces with a one or more processors 502, a random access memory (RAM) 503, a read only memory (ROM) 504, a computer-readable storage medium 505, a display device 507, a user input device 508, and a network device 509.

The one or more processors 502 may take many forms, such as, but not limited to: a central processing unit (CPU); a multi-processor unit (MPU); an ARM processor; or the like.

In the example embodiment, the one or more processors 502 and the random access memory (RAM) 503 form a processing unit 520. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network device 509 provides one or more wired or wireless interfaces for exchanging data and commands between the user-generated content profile generation device 407 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 512, application programs 513, and device drivers 514) are loaded into the memory 503 (of the processing unit 520) from the computer-readable storage medium 505, the ROM 504 or any other storage location. During execution of these software programs, the respective machine-executable instructions are accessed by the CPU 502 (of the processing unit 520) via the bus 501, and then executed by the CPU 502. Data used by the software programs are also stored in the memory 503, and such data is accessed by the CPU 502 during execution of the machine-executable instructions of the software programs and modules.

The computer-readable storage medium 505 is one of a (or a combination of two or more of) a hard drive, a flash drive, a DVD, a CD, a flash storage, a solid state drive, a ROM, an EEPROM, and the like. The computer-readable storage medium 505 includes an operating system 512, the software programs 513, device drivers 514, a user-generated content profile generation module 515, and user-generated content 516.

In the example embodiment, the processing unit 520 loads machine-executable instructions of the user-generated content profile generation module 515 and executes the instructions to collect user-generated content 516 uploaded by a person (that is identified by a unique identifier) to the social-media server 404. The processing unit 520 collects the user-generated content 516 by using an application programming interface (API) of the social-media server 404. Executing the instructions of the user-generated content profile generation module 515, the processing unit 520 generates a personal profile of the person by applying one or more of object recognition, voice recognition, character recognition, and textual analysis processing to the user-generated content 516 to generate one or more keywords, the generated personal profile including the one or more keywords. Executing the instructions of the user-generated content profile generation module 515, the processing unit 520 stores the generated personal profile in a storage medium (705 of FIG. 7) of the profile repository 409.

FIG. 6 is a detailed block diagram depicting the internal architecture of the personal data profile generation device 408.

The bus 601 interfaces with a one or more processors 602, a random access memory (RAM) 603, a read only memory (ROM) 604, a computer-readable storage medium 605, a display device 607, a user input device 608, and a network device 609.

The one or more processors 602 may take many forms, such as, but not limited to: a central processing unit (CPU); a multi-processor unit (MPU); an ARM processor; or the like.

In the example embodiment, the one or more processors 602 and the random access memory (RAM) 603 form a processing unit 620. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network device 609 provides one or more wired or wireless interfaces for exchanging data and commands between the user-generated content profile generation device 407 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 612, application programs 613, and device drivers 614) are loaded into the memory 603 (of the processing unit 620) from the computer-readable storage medium 605, the ROM 604 or any other storage location. During execution of these software programs, the respective machine-executable instructions are accessed by the CPU 602 (of the processing unit 620) via the bus 601, and then executed by the CPU 602. Data used by the software programs are also stored in the memory 603, and such data is accessed by the CPU 602 during execution of the machine-executable instructions of the software programs and modules.

The computer-readable storage medium 605 is one of a (or a combination of two or more of) a hard drive, a flash drive, a DVD, a CD, a flash storage, a solid state drive, a ROM, an EEPROM, and the like. The computer-readable storage medium 605 includes an operating system 612, the software programs 613, device drivers 614, a personal data profile generation module 615, and personal data 616.

In the example embodiment, the processing unit 620 loads machine-executable instructions of the personal data profile generation module 615 and executes the instructions to collect personal data 616 (for person that is identified by a unique identifier) that is generated by the personal data processing server 405. The processing unit 620 collects the personal data 616 by using an application programming interface (API) of the personal data processing server 405. Executing the instructions of the personal data profile generation module 615, the processing unit 620 generate a personal profile of the person by applying big data analytics to the collected personal data to generate one or more keywords to the personal data 616 to generate one or more keywords, the generated personal profile including the one or more keywords. Executing the instructions of the personal data profile generation module 615, the processing unit 620 stores the generated personal profile in a storage medium (705 of FIG. 7) of the profile repository 409.

FIG. 7 is a detailed block diagram depicting the internal architecture of the profile repository 409.

The bus 701 interfaces with a one or more processors 702, a random access memory (RAM) 703, a read only memory (ROM) 704, a computer-readable storage medium 705, a display device 707, a user input device 708, and a network device 709.

The one or more processors 702 may take many forms, such as, but not limited to: a central processing unit (CPU); a multi-processor unit (MPU); an ARM processor; or the like.

In the example embodiment, the one or more processors 702 and the random access memory (RAM) 703 form a processing unit 720. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network device 709 provides one or more wired or wireless interfaces for exchanging data and commands between the user-generated content profile generation device 407 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 712, application programs 713, and device drivers 714) are loaded into the memory 703 (of the processing unit 720) from the computer-readable storage medium 705, the ROM 704 or any other storage location. During execution of these software programs, the respective machine-executable instructions are accessed by the CPU 702 (of the processing unit 720) via the bus 701, and then executed by the CPU 702. Data used by the software programs are also stored in the memory 703, and such data is accessed by the CPU 702 during execution of the machine-executable instructions of the software programs and modules.

The computer-readable storage medium 705 is one of a (or a combination of two or more of) a hard drive, a flash drive, a DVD, a CD, a flash storage, a solid state drive, a ROM, an EEPROM, and the like. The computer-readable storage medium 705 includes an operating system 712, the software programs 713, device drivers 714, an authentication module 715 and a profile data store 716.

In the example embodiment, the processing unit 720 loads machine-executable instructions of the authentication module 715 and executes the instructions to authenticate a unique identifier provided by an electronic device (e.g., the electronic device 100 or 401) that is requesting a personal profile for a person identified by the unique identifier. Responsive to a determination that the unique identifier has been authenticated, the processing unit 720 executes loads and executes instructions of the profile data store 716 to access one or more profiles that correspond to the authenticated unique identifier and to provide the one or more profiles to the electronic device that has requested the personal profile (e.g., the electronic device 100 or 401).

In the example embodiment, the processing unit 720 executes loads and executes instructions of the profile data store 716 to store one or more personal profiles received from one or more of the photo profile generation device 406, the user-generated content profile generation device 407, and the personal data profile generation device 408 in the storage medium 705 in association with a corresponding unique identifier.

In some embodiments, the processing unit 720 executes loads and executes instructions of the profile data store 716 to combine profiles associated with the same unique identifier. For example, the processing unit 720 can combine a profile generated for a person by each of photo profile generation device 406, the user-generated content profile generation device 407, and the personal data profile generation device 408 into a single profile for the person, the profile being associated with a single unique identifier.

FIG. 8 is a detailed block diagram depicting the internal architecture of the photo profile generation device 406.

The bus 801 interfaces with a one or more processors 802, a random access memory (RAM) 803, a read only memory (ROM) 804, a computer-readable storage medium 805, a display device 807, a user input device 808, and a network device 809.

The one or more processors 802 may take many forms, such as, but not limited to: a central processing unit (CPU); a multi-processor unit (MPU); an ARM processor; or the like.

In the example embodiment, the one or more processors 802 and the random access memory (RAM) 803 form a processing unit 820. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network device 809 provides one or more wired or wireless interfaces for exchanging data and commands between the user-generated content profile generation device 407 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 812, application programs 813, and device drivers 814) are loaded into the memory 803 (of the processing unit 820) from the computer-readable storage medium 805, the ROM 804 or any other storage location. During execution of these software programs, the respective machine-executable instructions are accessed by the CPU 802 (of the processing unit 820) via the bus 801, and then executed by the CPU 802. Data used by the software programs are also stored in the memory 803, and such data is accessed by the CPU 802 during execution of the machine-executable instructions of the software programs and modules.

The computer-readable storage medium 805 is one of a (or a combination of two or more of) a hard drive, a flash drive, a DVD, a CD, a flash storage, a solid state drive, a ROM, an EEPROM, and the like. The computer-readable storage medium 805 includes an operating system 812, the software programs 813, device drivers 814, a photo profile generation module 815, and photos 816.

In the example embodiment, the processing unit 820 loads machine-executable instructions of the photo profile generation module 815 and executes the instructions to collect photos 816 uploaded by a person (that is identified by a unique identifier) to the photo sharing server 403. The processing unit 820 collects the photos 816 by using an application programming interface (API) of the photo sharing server 403. Executing the instructions of the photo profile generation module 815, the processing unit 820 generates a personal profile of the person by applying one or more of object recognition and character recognition to the photos 816 to generate one or more keywords, the generated personal profile including the one or more keywords. Executing the instructions of the photo profile generation module 815, the processing unit 820 stores the generated personal profile in a storage medium (705 of FIG. 7) of the profile repository 409.

FIG. 9 is a detailed block diagram depicting the internal architecture of the marketing server 402.

The bus 901 interfaces with a one or more processors 902, a random access memory (RAM) 903, a read only memory (ROM) 904, a computer-readable storage medium 905, a display device 907, a user input device 908, and a network device 909.

The one or more processors 902 may take many forms, such as, but not limited to: a central processing unit (CPU); a multi-processor unit (MPU); an ARM processor; or the like.

In the example embodiment, the one or more processors 902 and the random access memory (RAM) 903 form a processing unit 920. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network device 909 provides one or more wired or wireless interfaces for exchanging data and commands between the user-generated content profile generation device 407 and other devices. Such wired and wireless interfaces include, for example, a Universal Serial Bus (USB) interface, blue tooth interface, Wi-Fi interface, Ethernet interface, Near Field Communication (NFC) interface, and the like.

Machine-executable instructions in software programs and modules (such as an operating system 912, application programs 913, and device drivers 914) are loaded into the memory 903 (of the processing unit 920) from the computer-readable storage medium 905, the ROM 904 or any other storage location. During execution of these software programs, the respective machine-executable instructions are accessed by the CPU 902 (of the processing unit 920) via the bus 901, and then executed by the CPU 902. Data used by the software programs are also stored in the memory 903, and such data is accessed by the CPU 902 during execution of the machine-executable instructions of the software programs and modules.

The computer-readable storage medium 905 is one of a (or a combination of two or more of) a hard drive, a flash drive, a DVD, a CD, a flash storage, a solid state drive, a ROM, an EEPROM, and the like. The computer-readable storage medium 905 includes an operating system 912, the software programs 913, device drivers 914, a target profile management module 915, target personal profiles 916, and marketer information 917.

In the example embodiment, the processing unit 920 loads machine-executable instructions of the target profile management module 915 and executes the instructions to provide an electronic device (e.g., the electronic device 100 of FIG. 1) with one or more target personal profiles 916.

In some embodiments, executing the instructions of the target profile management module 915, the marketing server processing unit 920 provides at least one target personal profile 916 to an electronic device (e.g., the electronic device 100) responsive to a request received from the electronic device.

In some embodiments, the marketing server 402 receives location information for one or more electronic devices, and executing the instructions of the target profile management module 915, the marketing server processing unit 920 provides target personal profiles 916 to electronic devices (e.g., the electronic device 100) based on the received location information. For example, a retail location can contain a retail electronic device that is associated with the marketing server, the retail electronic device can receive location information of electronic devices, and the marketing server 402 can provide one or more target profiles to one or more electronic devices (via the retail electronic device) based on proximity of the electronic devices to the retail electronic device.

In some embodiments, executing the instructions of the target profile management module 915, the marketing server processing unit 920 provides at least one target personal profile 916 to an electronic device (e.g., the electronic device 100) based on proximity of the electronic device to an electronic device associated with the marketing server 402.

In some embodiments, executing the instructions of the target profile management module 915, the marketing server processing unit 920 provides at least one target personal profile 916 to an electronic device (e.g., the electronic device 100) based on physical contact between the electronic device and an electronic device associated with the marketing server 402.

In some embodiments, location information identifying a location of an electronic device associated with the marketing server 402 is determined, executing the instructions of the target profile management module 915, the marketing server processing unit 920 provides at least one target personal profile 916 to an electronic device (e.g., the electronic device 100) having a location within an area determined by the determined location information. In some embodiments, the location information describes a place, and the marketing server processing unit 920 provides at least one target personal profile 916 to an electronic device (e.g., the electronic device 100) located in the place described by the location information. In some embodiments, the location information describes an event, and the marketing server processing unit 920 provides at least one target personal profile 916 to an electronic device (e.g., the electronic device 100) located at the event described by the location information. In some embodiments, the location information describes location coordinates, and the marketing server processing unit 920 provides at least one target personal profile 916 to an electronic device (e.g., the electronic device 100) located within a specified distance from the location coordinates described by the location information.

In the example embodiment, the processing unit 920 loads machine-executable instructions of the target profile management module 915 and executes the instructions to provide an electronic device (e.g., the electronic device 100 of FIG. 1) with marketer information 917 responsive. In the example embodiment, executing the instructions of the target profile management module 915, the marketing server processing unit 920 provides the electronic device with marketer information 917 responsive to a request for marketer information from the electronic device, the request indicting that the electronic device processing unit 220 has executed the instructions of the matching module 216 and has determined a match between a target personal profile 916 (received by the electronic device from the marketing server 402) and a personal profile for a user that is associated with a unique identifier (e.g., a scanned fingerprint data received at the electronic device 100 via the fingerprint scanner 102) received by the electronic device.

In some embodiments, executing the instructions of the target profile management module 915, the marketing server processing unit 920 provides the electronic device with marketer information 917 responsive to a request for marketer information from the electronic device, the request including a personal profile for a user that is associated with a unique identifier (e.g., a scanned fingerprint data received at the electronic device 100 via the fingerprint scanner 102) received by the electronic device. The marketing server processing unit 920 determines a match between a target personal profile 916 and the received personal profile, and responsive to a determination of a match, the marketing server processing unit 920 provides the electronic device with marketer information 917.

In the example embodiment, the marketer information 917 includes at least one of advertising information and reward information. In the example embodiment, the reward information includes information related to at least one of a coupon, a prize, a credit, a monetary reward, information for a marketing promotion, and the like.

Responsive to the marketer information 917, the electronic device displays a visual representation of the received marketer information.

Figure 10:
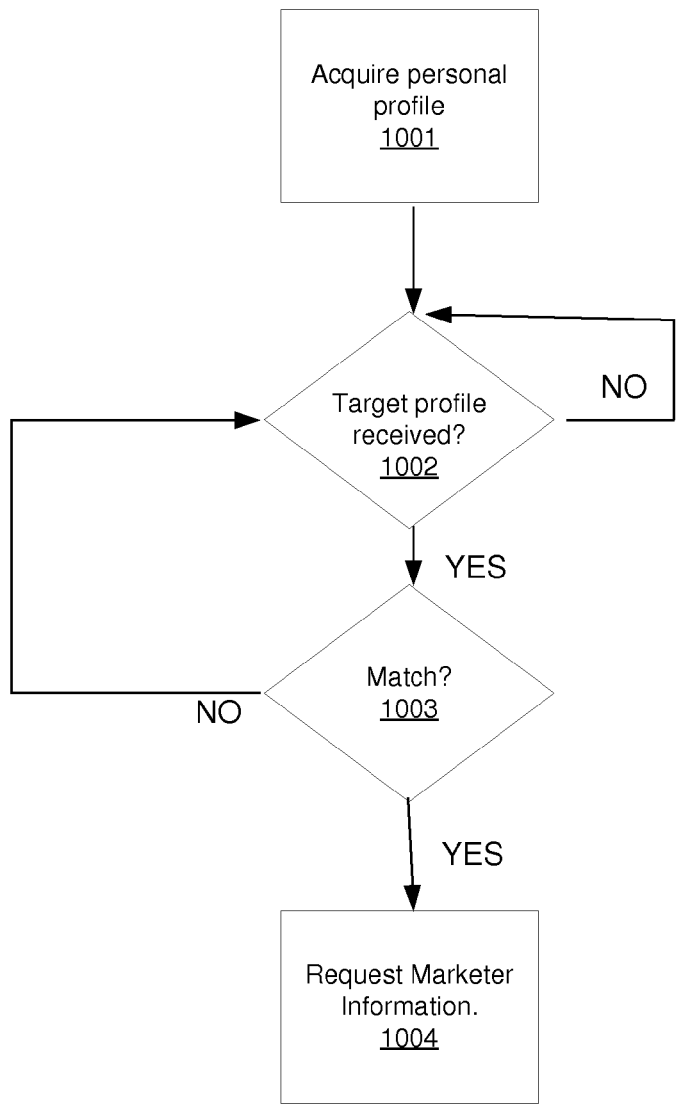
FIG. 10 is a flow diagram for explaining processing performed by the electronic device of FIG. 1 according to an example embodiment.

FIG. 10 is a flow diagram for explaining processing performed by the electronic device 100 of FIG. 1 according to an example embodiment.

Responsive to the user of device 100 scanning their finger on the fingerprint scanner 102 of device 100, at 1001, the electronic device 100 is controlled to acquire the personal profile for the user (from the profile generation system 400), who is identified by the scanned fingerprint data received at the electronic device 100 via the fingerprint scanner 102.

At 1002, the electronic device processing unit 220 of the electronic device determines whether the electronic device 100 has received a target personal profile from the marketing server 402, as described above with respect to FIG. 9. If a target personal profile has not been received ("NO" at 1002) processing returns to 1002. If a target personal profile has been received ("YES" at 1002) processing proceeds to 1003. At 1003, the electronic device 100 is controlled to perform a match between the personal profile of the user and the target personal profile. The target personal profile is a profile that specifies a marketer's target consumer.

If a match has been identified ("YES" at 1003), then processing proceeds to 1004 and the processing unit 220 executes instructions of the matching module 216 to provide the marketing server 402 with a request for marketer information from the electronic device 100, the request indicting that the electronic device processing unit 220 has executed the instructions of the matching module 216 and has determined a match between the target personal profile 916 (received by the electronic device from the marketing server 402) and the personal profile received by the electronic device at the process S1001. The processing unit 220 executes instructions of the matching module 216 to control the display device 207 to display a visual representation of the received marketer information on the touch screen display 101 of the electronic device 100.

If a match has not been identified ("NO" at 1003), then processing returns to 1002.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method comprising:
   for each of a plurality of users, a trusted third party server generating an anonymous user-generated content profile for the user by: collecting user-generated content for the user by using an application programming interface (API) of at least one social-media server and generating a plurality of keywords from the collected user-generated content without processing any personally identifiable information;
   the trusted third party server storing each anonymous user-generated content profile in association with fingerprint data of the respective user;
   a first user profile module included in an electronic device receiving fingerprint data directly from a first fingerprint scanner included in the electronic device via a bus included in the electronic device;
   the first user profile module providing a request for an anonymous user-generated content profile of a user of the electronic device to the trusted third party server via a network device included in the electronic device, the request being a request for an anonymous user-generated content profile that is stored in association with the fingerprint data received from the first fingerprint scanner, wherein the request includes the fingerprint data;
   the trusted third party server accessing the anonymous user-generated content profile stored in association with the fingerprint data received from the first user profile module and providing the accessed anonymous user-generated content profile to the first user profile module;
   the first user profile module receiving the anonymous user-generated content profile from the trusted third party server via the network device;
   a marketing server providing a target personal profile to a first user matching module included in the electronic device;
   the first user matching module receiving the target personal profile from the marketing server via the network device wherein the target personal profile specifies a target consumer of a marketer;
   the first user matching module determining a match between the received anonymous user-generated content profile and the target personal profile;

responsive to the first user matching module determining a match between the anonymous user-generated content profile and the target personal profile, the first user matching module providing the marketing server with a request for marketer information via the network device, the request indicting that the first user matching module has determined the match between the target personal profile and the anonymous user-generated content profile provided by the trusted third party server;

the marketing server providing the marketer information to the first user matching module as a response to the request indicting that the first user matching module has determined the match between the target personal profile and the anonymous user-generated content profile;

the first user matching module receiving the marketer information via the network device as a response to the request for marketer information, wherein the marketer information includes at least one of advertising information and reward information; and responsive to the marketer information, the first user matching module controlling a display device included in the electronic device of the user to display a visual representation of the marketer information, wherein the first user matching module is coupled to the display device via the bus included in the electronic device, wherein the first user matching module determines the match between the anonymous user-generated content profile and the target personal profile by comparing keywords of the anonymous user-generated content profile and keywords of the target personal profile, and wherein the electronic device includes the first user profile module, the first user matching module, the bus, the network device, the fingerprint scanner, and the display device.

2. The method of claim 1, wherein the marketing server provides the electronic device with the target personal profile responsive to a request received from the electronic device.

3. The method of claim 1,
further comprising: the marketing server receiving location information of the electronic device,
wherein the marketing server provides the electronic device with the target personal profile based on the received location information of the electronic device.

4. The method of claim 3, wherein the marketing server provides the electronic device with the target personal profile based on proximity of the electronic device to a retail electronic device that is associated with the marketing server.

5. The method of claim 3, wherein the marketing server provides the electronic device with the target personal profile based on physical contact between the electronic device and a retail electronic device that is associated with the marketing server.

6. The method of claim 1,
wherein the marketer information includes reward information, and
wherein the reward information includes information related to a coupon.

7. The method of claim 1,
wherein the marketer information includes reward information, and
wherein the reward information includes information related to a prize.

8. The method of claim 1,
wherein the marketer information includes reward information, and
wherein the reward information includes information related to a credit.

9. The method of claim 1, wherein the electronic device is a mobile phone.

10. A profile matching system comprising:
a trusted third party server constructed to:
for each of a plurality of users, generate an anonymous user-generated content profile for the user by: collecting user-generated content for the user by using an application programming interface (API) of at least one social-media server and generating a plurality of keywords from the collected user-generated content without processing any personally identifiable information,
store each anonymous user-generated content profile in association with fingerprint data of the respective user, and
provide a stored anonymous user-generated content profile to an electronic device as a response to a request from the electronic device that includes fingerprint data associated with the anonymous user-generated content profile;
a marketing server external to the trusted third party server storing a plurality of marketer information and a plurality of target personal profiles, the marketing server being constructed to provide a target personal profile to the electronic device and provide marketer information to the electronic device as a response to a marketer request received from the electronic device indicting that a user matching module of the electronic device has determined a match between the target personal profile of the marketing server and an anonymous user-generated content profile provided by the trusted third party server to the electronic device; and
the electronic device, wherein the electronic device comprises:
a bus,
a fingerprint scanner coupled to the bus,
a network device coupled to the bus,
a display device coupled to the bus,
the user matching module, coupled to the fingerprint scanner, the network device, and the display device via the bus,
wherein the electronic device is external to the trusted third party server and the marketing server,
wherein the user matching module is coupled to the marketing server and the trusted third party server via the network device,
wherein the user matching module is constructed to:
provide fingerprint data received directly from the fingerprint scanner via the bus to the trusted third party server via the network device,
receive from the trusted third party server the anonymous user-generated content profile that is stored in association with the fingerprint data provided by the user matching module,
determine a match between the target personal profile received from the marketing server and the anonymous user-generated content profile,
provide the marketing server with the marketer request indicting that the user matching module has determined the match between the target personal profile and the anonymous user-generated content profile provided by the trusted third party server, receive the marketer information from the marketing server as a response to the marketer request, and
control the display device to display a visual representation of the received marketer information.

* * * * *